US012782037B2

(12) United States Patent
Wan et al.

(10) Patent No.: US 12,782,037 B2
(45) Date of Patent: Nov. 3, 2026

(54) REFRIGERATION APPARATUS AND PRODUCTION METHOD THEREOF

(71) Applicants: QINGDAO HAIER REFRIGERATOR CO., LTD, Qingdao (CN); HAIER SMART HOME CO., LTD., Qingdao (CN)

(72) Inventors: Yanbin Wan, Qingdao (CN); Jianquan Chen, Qingdao (CN); Xiaobing Zhu, Qingdao (CN)

(73) Assignees: QINGDAO HAIER REFRIGERATOR CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 296 days.

(21) Appl. No.: 18/556,316

(22) PCT Filed: Jan. 10, 2022

(86) PCT No.: PCT/CN2022/071043

§ 371 (c)(1),
(2) Date: Oct. 19, 2023

(87) PCT Pub. No.: WO2022/227698

PCT Pub. Date: Nov. 3, 2022

(65) Prior Publication Data

US 2024/0210099 A1 Jun. 27, 2024

(30) Foreign Application Priority Data

Apr. 28, 2021 (CN) ......................... 202110465583.5

(51) Int. Cl.

| | |
|---|---|
| ***F25D 23/06*** | (2006.01) |
| ***B29C 44/12*** | (2006.01) |
| ***F04B 39/00*** | (2006.01) |

(52) U.S. Cl.

CPC ........ *F25D 23/061* (2013.01); *B29C 44/1233* (2013.01); *F04B 39/0083* (2013.01); *F25D 2201/30* (2013.01)

(58) Field of Classification Search

CPC ............... F25D 23/061; F25D 2201/30; F25D 23/006; F25D 11/00; F25D 19/00;

(Continued)

(56) References Cited

U.S. PATENT DOCUMENTS 9,305,539 B2 * 4/2016 Lind ......................... F24F 7/04
9,939,189 B2 * 4/2018 Koo ...................... F25B 31/006

(Continued)

FOREIGN PATENT DOCUMENTS

CN 203274205 U 11/2013
CN 205655564 U 10/2016

(Continued)

OTHER PUBLICATIONS

Machine translation of CN106839605 (Year: 2017).*
Machine translation of JPH10306972A (Year: 1998).*
Machine translation of CN-107514858 (Year: 2017).*
Machine translation of CN-206021898-U (Year: 2017).*

*Primary Examiner* — Forrest M Phillips
*Assistant Examiner* — Jennifer B Olson
(74) *Attorney, Agent, or Firm* — Muncy, Geissler, Olds & Lowe. P.C.

(57) ABSTRACT

A refrigeration apparatus and a production method thereof. The refrigeration apparatus includes a silencing device. The silencing device includes a silencing channel, and the silencing channel is communicated with an inner vent of a compressor bin and an outer vent of a housing. The silencing device is provided in a foaming space and thus does not occupy a space inside the refrigeration apparatus. The compressor bin is connected with the outside through the silencing channel, thus reducing noise radiated outwards from the compressor bin.

9 Claims, 4 Drawing Sheets

(58) Field of Classification Search

CPC ............... F25D 23/062; B29C 44/1233; B29C 44/18; B29C 44/12; B29C 44/1228; F04B 39/0083; F04B 39/06; F04B 39/12; F04B 39/123; F04B 39/121; F04B 39/14; B29L 2031/7622; F25B 2500/12

USPC .................................................. 181/214, 200

See application file for complete search history.

(56) References Cited

U.S. PATENT DOCUMENTS

| | | | | |
|---|---|---|---|---|
| 10,126,039 | B2 * | 11/2018 | Boehringer | F24F 13/24 |
| 11,835,289 | B2 * | 12/2023 | Wang | F25D 11/02 |
| 2014/0014436 | A1 * | 1/2014 | Nguyen | F24F 13/082 181/210 |
| 2020/0141629 | A1 * | 5/2020 | Seo | F25D 23/067 |
| 2021/0199366 | A1 * | 7/2021 | Gochika | F25D 23/006 |
| 2024/0118016 | A1 * | 4/2024 | Lee | F25D 23/003 |

FOREIGN PATENT DOCUMENTS

| | | | | | |
|---|---|---|---|---|---|
| CN | 206021898 | U | * | 3/2017 | |
| CN | 106839605 | A | | 6/2017 | |
| CN | 107514858 | | * | 12/2017 | |
| CN | 107514858 | A | | 12/2017 | |
| CN | 108571849 | A | | 9/2018 | |
| CN | 109695997 | A | * | 4/2019 | F25D 19/00 |
| CN | 109708388 | A | | 5/2019 | |
| CN | 209875570 | U | | 12/2019 | |
| CN | 209893707 | U | | 1/2020 | |
| CN | 111811192 | A | | 10/2020 | |
| CN | 215256700 | U | | 12/2021 | |
| EP | 3764034 | A1 | | 1/2021 | |
| JP | 1994213552 | A | | 8/1995 | |
| JP | 1996261634 | A | | 10/1997 | |
| JP | H10306972 | | * | 11/1998 | |

* cited by examiner

REFRIGERATION APPARATUS AND PRODUCTION METHOD THEREOF

CROSS REFERENCE TO RELATED APPLICATIONS

This application is a U.S. National Stage of International Application No. PCT/CN2022/071043 filed on Jan. 10, 2022, for which priority is claimed under 35 U.S.C. § 120; and this application claims priority of Application No. CN 202110465583.5 filed in China on Apr. 28, 2021 under 35 U.S.C. § 119, the entire contents of all of which are hereby incorporated by reference.

TECHNICAL FIELD

The present invention relates to a refrigeration apparatus, and in particular, to a production method of the refrigeration apparatus.

BACKGROUND

In a refrigeration apparatus, a compressor works on a refrigerant to realize circulation flow of the refrigerant for refrigeration, and noise is generated during working of the compressor; the compressor is provided in a compressor bin, other components, such as a fan, or the like, are generally arranged in the compressor bin and also generate noise, and these apparatuses generate heat while generating the noise, and are required to be cooled to guarantee normal working thereof. Therefore, a channel of the compressor bin communicated with the outside is necessary, and the noise generated by the compressor is also transmitted to the outside through the channel; a space inside the refrigeration apparatus is limited, and the internal limited space is occupied when a damping and noise reduction apparatus is added, such that inhibition of the noise of the refrigeration apparatus and space utilization cannot be well balanced and are difficult to consider at the same time, thus affecting a noise reduction effect, and then influencing use experiences of a user.

SUMMARY

To solve noise reduction and space occupation problems in the prior art, an object of the present invention is to provide a refrigeration apparatus and a production method thereof.

To achieve the above object of the present invention, an embodiment of the present invention provides a refrigeration apparatus, comprising a compressor bin and a housing, wherein the compressor bin is provided in the housing, and a foaming space is provided between the compressor bin and the housing; the refrigeration apparatus further comprises a silencing device provided in the foaming space, the compressor bin comprises an inner vent communicated with the outside, the housing comprising an outer vent opposite to the inner vent, the silencing device comprises a silencing channel, and the silencing channel is communicated with the inner vent and the outer vent.

As a further improvement of the present invention, each of a left side and a right side of the compressor bin is provided with the inner vent, as well as the silencing device and the outer vent corresponding to the inner vent, one inner vent is set as an air inlet, and the other inner vent is set as an air outlet.

As a further improvement of the present invention, the compressor bin comprises a cavity and side walls arranged on two sides of the cavity, the refrigeration apparatus comprises a compressor provided in the cavity, the side walls are provided with the inner vents, the inner vents are communicated with the cavity, and the silencing devices are fixed on the side walls.

As a further improvement of the present invention, the side wall is provided with a plurality of first clamping parts, the silencing device comprises a silencing body and a plurality of second clamping parts arranged on a side of the silencing body facing the side wall and clamped to the first clamping parts, and the side wall is fixedly connected with the silencing device by a fastener.

As a further improvement of the present invention, the first clamping part comprises a clamping opening and a first clamping block, the second clamping part comprises a second clamping block and a clamping groove, the second clamping block is connected to the first clamping block through the clamping opening, and the first clamping block is fixed in the clamping groove.

As a further improvement of the present invention, a flow channel is provided between the silencing device and the housing and/or the side wall, and the flow channel is communicated with a part of the foaming space above the silencing device and a part of the foaming space below the silencing device.

As a further improvement of the present invention, the silencing device is hermetically connected with the housing, the silencing device comprises a silencing body and a protective part provided between the housing and the silencing body, and the protective part comprises a protective net transversely provided between the silencing channel and the outer vent; the protective part is clamped to a port of the silencing channel.

As a further improvement of the present invention, the silencing device comprises a plurality of silencing cavities, and the silencing cavities comprise openings towards the silencing channel.

As a further improvement of the present invention, at least two of the silencing cavities have different volumes.

To achieve the above object of the present invention, an embodiment of the present invention provides the refrigeration apparatus is configured as the above refrigeration apparatus, and the production method comprises the following steps:

fixedly connecting the silencing device in the foaming space outside the compressor bin;

mounting the housing; and injecting a foaming agent into the foaming space.

As a further improvement of the present invention,

Compared with the prior art, the present invention has the following beneficial effects: a silencing device is provided in a foaming space, and since the foaming space unavoidably occupies some spaces, a space inside the refrigeration apparatus is not occupied when the foaming space is utilized, and a compressor bin is connected with the outside through a silencing channel, energy of sounds is weakened during outward heat dissipation of the compressor bin, and noise radiated outwards from the compressor bin is reduced, such that the solution realizes good balance between noise reduction and space utilization of the refrigeration apparatus, noise generated by the refrigeration apparatus is small, a space utilization rate is high, and use experiences of a user are improved greatly.

Figure 1:
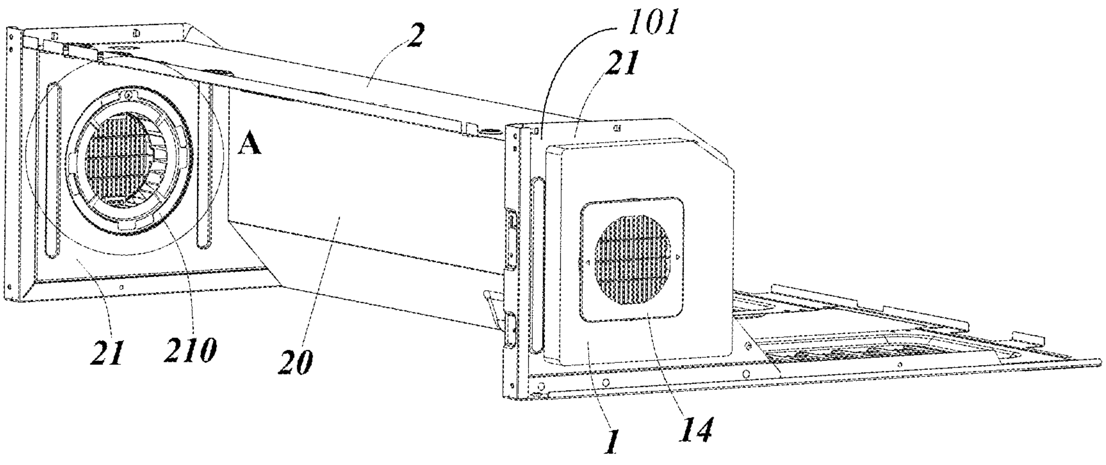
FIG. 1 is a schematic structural diagram of a compressor bin in an embodiment of the present invention.

In the drawings: 100. refrigeration apparatus; 1. silencing device; 10. flow channel; 11. silencing body; 12. silencing channel; 13. second clamping part; 131. second clamping block; 132. clamping groove; 14. protective part; 141. protective net; 142. buckle; 15. silencing cavity; 151. opening; 2. compressor bin; 20. cavity; 21. side wall; 210. inner vent; 22. first clamping part; 221. clamping opening; 222. first clamping block; 3. housing; 31. outer vent; 4. fastener.

DETAILED DESCRIPTION

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

It should be understood that the terms expressive of spatial relative positions, such as "upper", "above", "lower", "below", or the like herein are used to describe the relationship of a unit or feature relative to another unit or feature in the drawings, for illustration and description. Terms expressive of the spatial relative positions are intended to include different orientations of the device in use or operation other than the orientations shown in the drawings.

An embodiment of the present invention provides a refrigeration apparatus and a production method thereof, the refrigeration apparatus generates low noise, and meanwhile, an internal noise reduction device hardly occupies an available internal space, such that a space utilization rate is high, and use experiences of a user are greatly improved.

Figure 5:
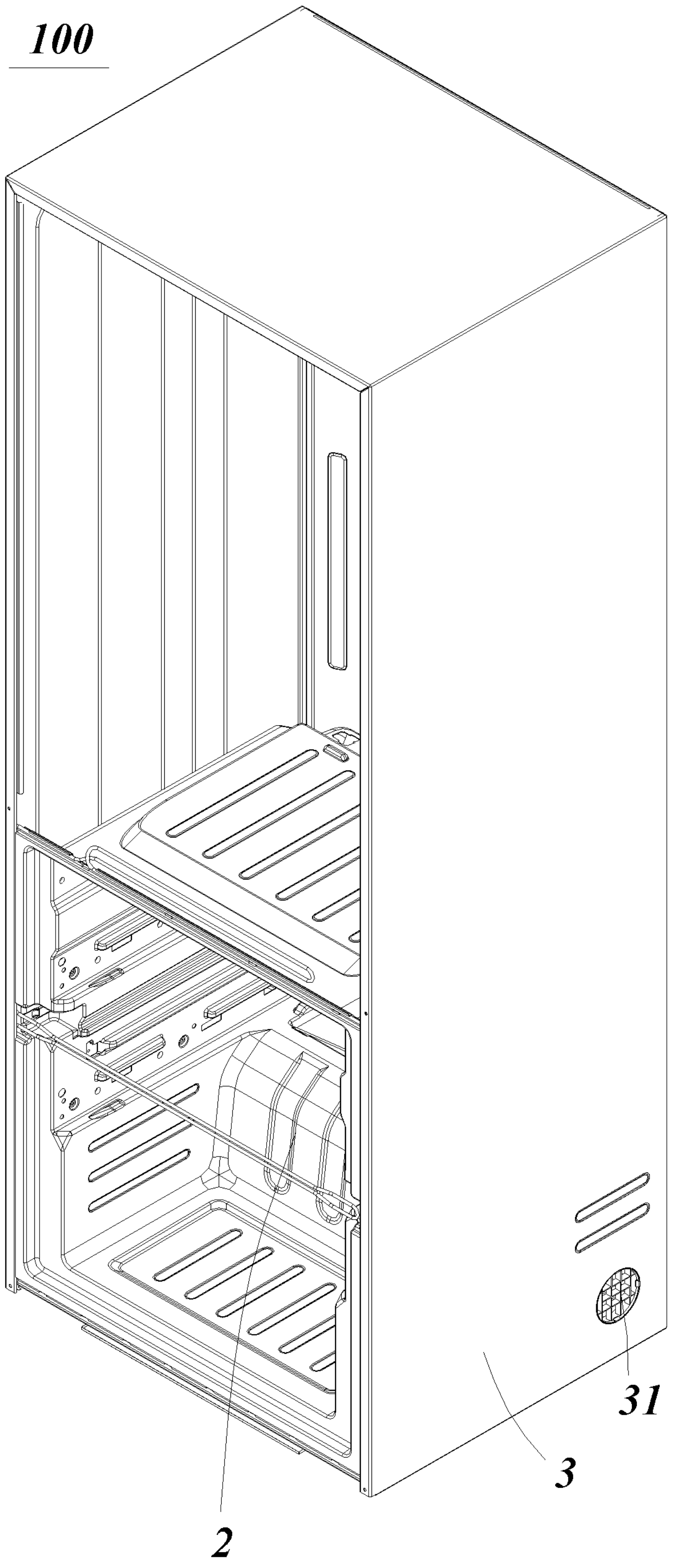
FIG. 5 is a schematic structural diagram of a refrigeration apparatus according to the embodiment of the present invention.

The refrigeration apparatus according to the present embodiment may be configured as a refrigerator, and as shown in FIG. 5, a refrigeration system is provided inside the refrigerator, the refrigeration system has a circulation loop for circulating a refrigerant, and the refrigeration system includes a compressor, a condenser, a throttling pipeline and an evaporator connected in series in sequence, the compressor is provided in a compressor bin 2, the compressor bin 2 may be located at any position of the refrigerator, such as a bottom, a middle, or a top, and the compressor bin 2 of FIG. 5 in the present embodiment is located at the bottom of the refrigerator.

In the present embodiment, noise radiated outwards from the compressor bin 2 is improved to solve a noise problem in a prior art.

To clearly express the position and direction described in the present embodiment, in the present embodiment, the up-down direction can be defined by substantially referring to the direction of gravity when the refrigerator is placed on a horizontal floor, and since the compressor bin 2 is provided inside the refrigerator, the direction from the back of the refrigerator towards the refrigerator cabinet serves as the rear, the rear of the refrigerator serves as the front, and both sides perpendicular to the front-rear direction serve as the left and right.

A refrigeration apparatus 100 according to the present embodiment includes a compressor bin 2 and a housing 3, the compressor bin 2 is provided in the housing 3, a foaming space 101 is provided between the compressor bin 2 and the housing 3, the housing 3 serves as a shell of the refrigerator in FIG. 5, the refrigerator is further internally provided with an inner liner, the foaming space 101 is formed outside the inner liner and the compressor bin 2 and located on an inner side of the housing 3, a foaming agent is injected into the foaming space 101 to achieve a heat insulation effect, and the foaming space 101 generally has a certain thickness to achieve the heat insulation effect. The compressor bin 2 includes side walls 21 arranged on left and right sides, a back plate, a bottom plate, a cover plate, or the like, which jointly enclose a cavity 20 of the compressor bin 2, and a compressor, a condenser, a fan, a water pan, or the like, are arranged in the cavity 20. The compressor bin 2 includes an inner vent 210 communicated with the outside, the housing 3 includes an outer vent 31 opposite to the inner vent 210, and heat in the cavity 20 is discharged outwards through the two vents.

The refrigeration apparatus 100 further includes a silencing device 1 provided in the foaming space 101, and as shown in FIGS. 1 to 4, the silencing device 1 is configured to reduce the noise emitted from the cavity 20, the silencing device 1 includes a silencing channel 12, and the silencing channel 12 communicates the inner vent 210 and the outer vent 31; preferably, the cavity 20 is communicated with the outside only through the silencing channel 12; that is, the compressor bin 2 is not directly communicated with the outside through other ways, and since the foaming space 101 has to occupy some spaces, mounting of the silencing device 1 at this position has the following several effects.

Firstly, the silencing device 1 does not occupy a space in the inner liner or the compressor bin 2 any longer, such that a utilization rate of the space in the compressor bin 2 is higher, a structure can be made more compact, the space of the inner liner can be made larger, and an effective utilization rate of the refrigerator is higher; when the user considers a smaller occupied area and a larger storage space of the refrigerator, this point becomes a favorable selling point of the refrigerator, a sales volume of the refrigerator is increased, and the use experiences of the user are improved;

secondly, a spatial position occupied by the silencing device 1 is a position where the compressor bin 2 is communicated with the outside for heat dissipation, the heat in the compressor bin 2 is required to be dissipated at this position, and the heat dissipation of the compressor bin 2 is affected by foaming at the position in an existing refrigerator. In the present embodiment, after the silencing device 1 is provided at this position, a foaming material filled at the position is reduced, such that the heat in the compressor bin 2 is more favorably dissipated outwards from the position, and temperature reduction of the compressor bin 2 is facilitated;

thirdly, the foaming material has a fixing function, and after the foaming material is injected into the foaming space 101, the foaming material is solidified to tightly fix the silencing device 1 at this position, thus reducing vibration of the silencing device 1; the silencing device 1 has a noise reduction function, such that it is necessary to stably fix the silencing device 1; the compressor is configured as a rotating machine and generates vibration in a working process, the compressor is fixed on the bottom plate of the compressor bin 2 and drives the whole compressor bin 2 to vibrate in the working process, and when the silencing device 1 is fixed in the compressor bin 2, the silencing device cannot be stably fixed compared with the arrangement in the foaming space 101, and after a long time, the silencing device 1 may loosen under the long-term vibration; when the silencing device 1 is provided in the foaming space 101 and fixed by the foaming material, the foaming material has a vibration absorbing function and firmly fixes the silencing device 1, the noise reduction effect is greatly improved, and a stable state is kept for a long time;

fourthly, a space structure design of the existing compressor bin 2 is not affected, and the silencing device 1 can be mounted without changing the space structure design, a heat dissipation design, a mechanical strength design and an internal wiring design of the compressor bin 2, the whole size of the refrigerator, or the like. Since the position of the silencing device 1 and the existing designs have no spatial interference relationship or have a quite small relationship, without greatly adjusting the existing structure, by little changing a production process, production parameters, die designs, or the like, the refrigeration apparatus 100 with the silencing device 1 can be transformed on the basis of the existing refrigeration apparatus 100, thereby greatly reducing a production cost;

fifthly, the noise reduction effect is good, a specific structure of the silencing device 1 is described below, a sound enters the silencing device 1 and then is transmitted along the silencing channel 12, a plurality of silencing cavities 15 are formed in the side wall 21 of the silencing channel 12, and at least part of the sound enters the silencing cavities 15, such that a propagation path of the sound passing through a through hole is increased, energy of the sound radiated outwards is reduced, and the noise reduction effect is achieved; a volume of the silencing cavity 15 can determine a frequency range of the sound capable of being eliminated by the silencing cavity 15, the silencing cavities 15 with different volumes have different silencing frequency ranges, and therefore, the sound can enter different silencing cavities 15 by adjusting the volumes of different silencing cavities 15, so as to eliminate the noise with different frequencies, such that the silencing device 1 has wider silencing frequencies.

Further, as shown in FIG. 1, each of the left and right sides of the compressor bin 2 is provided with the inner vent 210, as well as the silencing device 1 and the outer vent 31 corresponding to the inner vent 210, one inner vent 210 is set as an air inlet, the other inner vent 210 is set as an air outlet, the compressor bin 2 includes the cavity 20 and the side walls 21 provided on both sides of the cavity 20, the refrigeration apparatus 100 includes the compressor provided in the cavity 20, the side walls 21 are provided with the inner vents 210, the inner vents 210 are communicated with the cavity 20, and the silencing devices 1 are fixed on the side walls 21. The silencing devices 1 are arranged on the side walls 21 of the left and right sides of the existing compressor bin 2, and as shown in FIG. 1, when entering and exiting from the cavity 20, air flow passes through the silencing devices 1, such that the noise which is directly propagated outwards at the air flow inlet and outlet is reduced while an entrance and an exit of the air flow are facilitated.

Specifically, the side wall 21 is provided with a plurality of first clamping parts 22, the silencing device 1 includes a silencing body 11 and a plurality of second clamping parts 13 which are arranged on a side of the silencing body 11 facing the side wall 21 and clamped to the first clamping parts 22, and the side wall 21 is fixedly connected with the silencing device 1 by a fastener 4. The side wall and the silencing device are relatively fixed in a clamped manner and then tightly fixed by the fastener 4, and the reason is as follows: the fastener 4, such as a bolt and a screw, can only fix certain points generally, but a sealing performance at this position is important, and when the sealing performance is not good, the foaming material can enter the cavity 20 of the compressor bin 2 through a gap, such that the first clamping part 22 and the second clamping part 13 are connected in the clamped manner, the first clamping part 22 and the second clamping part 13 can be both annular, or be arranged around a circumference of the inner vent 210, so as to ensure that the whole circumference can be sealed and fixed.

Figure 2:
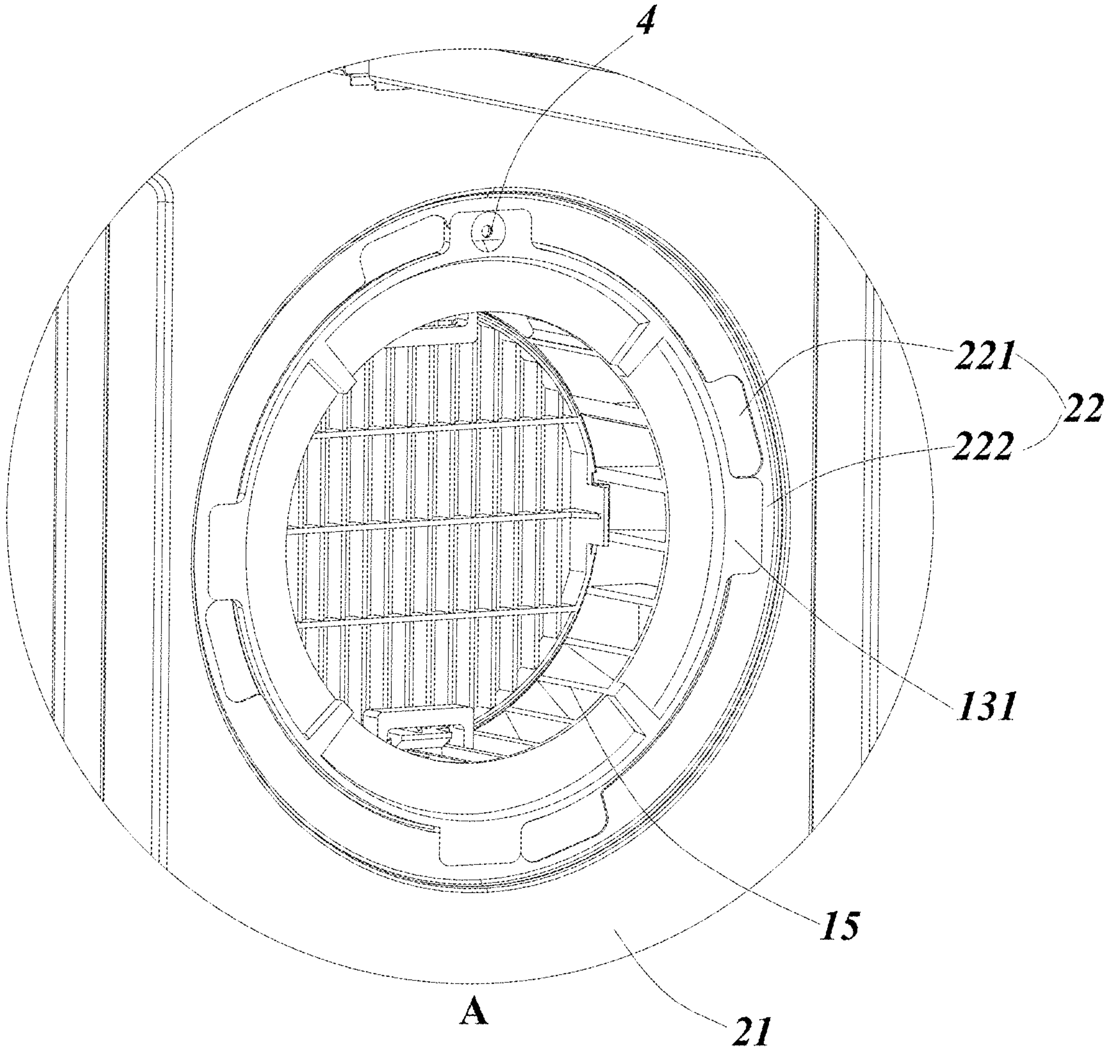
FIG. 2 is a partially enlarged view at A in FIG. 1.
Figure 3:
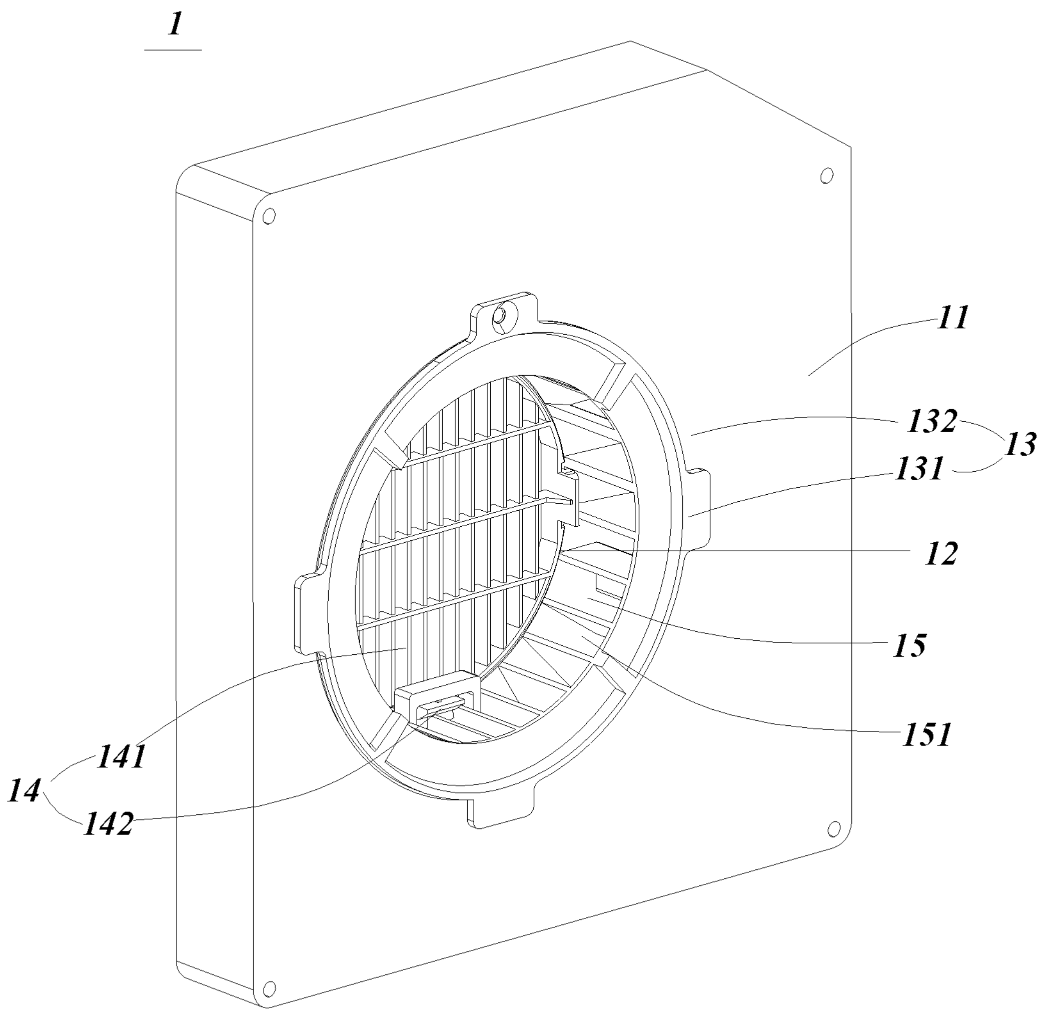
FIG. 3 is a schematic structural diagram of a silencing device in the embodiment of the present invention.

The inner vent 210 and the outer vent 31 may be circular, such that the first clamping part 22 and the second clamping part 13 may be distributed in a circular ring shape, as shown in FIGS. 2 and 3. The first clamping part 22 includes a clamping opening 221 and a first clamping block 222, the second clamping part 13 includes a second clamping block 131 and a clamping groove 132, and a plurality of groups (for example, four groups in the drawing) of clamping openings 221 and first clamping blocks 222 are arranged around the circumference of the inner vent 210; a plurality of groups (for example, four groups in the drawing) of second clamping blocks 131 and clamping grooves 132 are also correspondingly arranged around the circumference, the second clamping block 131 is connected to the first clamping block 222 through the clamping opening 221, and the first clamping block 222 is fixed in the clamping groove 132, so as to fixedly connect the silencing device 1 and the side wall 21 together.

During mounting, the first clamping block 222 of the silencing device 1 is inserted into the cavity 20 through the clamping opening 221 of the side wall 21 first, and then, the silencing device 1 is rotated to a certain angle to allow the first clamping block 222 of the side wall 21 to be clamped into the clamping groove 132 of the silencing device 1, and the clamping groove 132 is configured as a groove body formed between the second clamping block 131 and the silencing body 11, and therefore, fixed connection around the whole circumference is performed; after mounting is in place, the silencing device 1 and the side wall 21 are tightly connected by the fastener 4 to avoid separation thereof.

Figure 4:
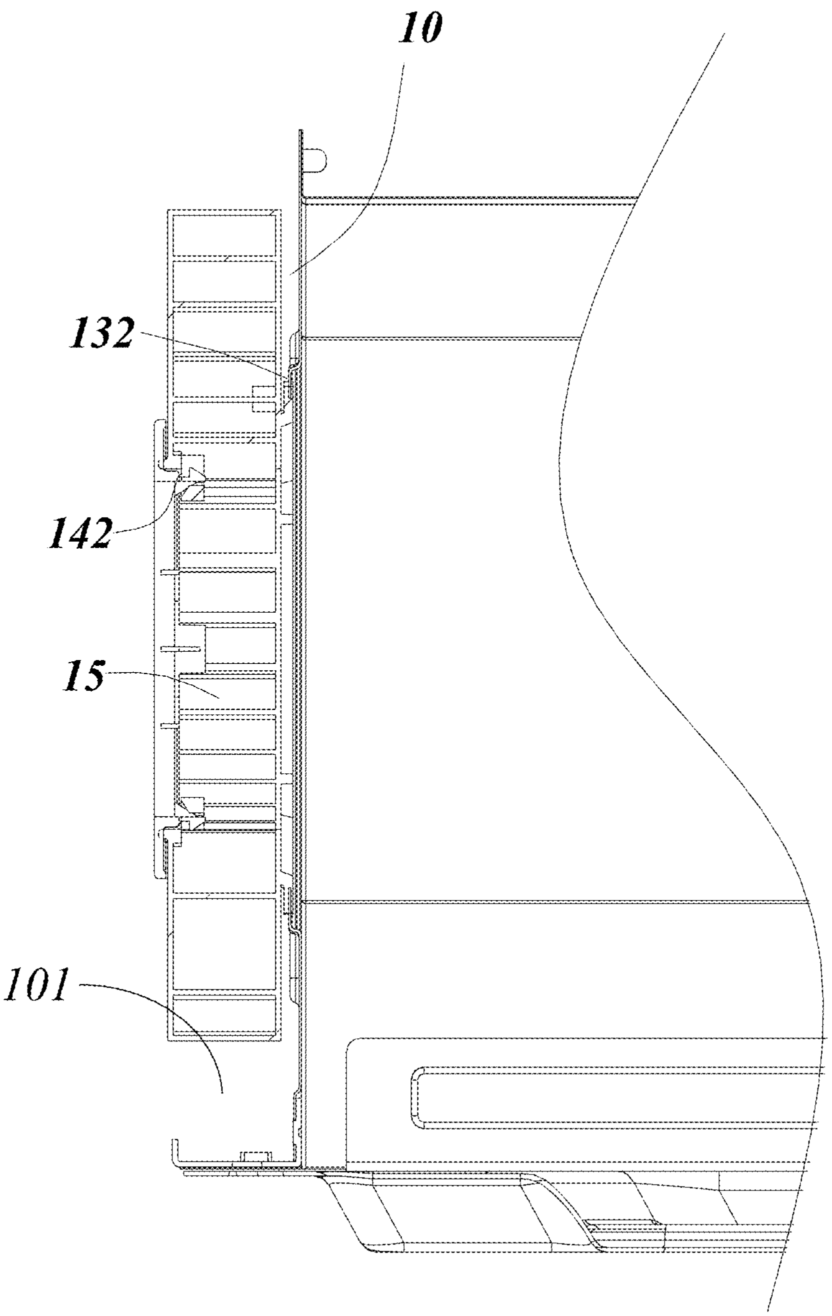
FIG. 4 is a partial sectional view of the compressor bin in the embodiment of the present invention.

A flow channel 10 is provided between the silencing device 1 and the housing 3 and/or the side wall 21, and as shown in FIG. 4, the flow channel 10 is communicated with a part of the foaming space 101 above the silencing device 1 and a part of the foaming space 101 below the silencing device, and when the foaming agent is injected into the foaming space 101, the foaming material enters the lower part or the upper part through the flow channel 10, thus avoiding that due to the arrangement of the silencing device 1, flowing of the foaming agent is blocked at this position, and the heat insulation performance in other parts of the foaming space 101 is influenced.

Further, the silencing device 1 is hermetically connected with the housing 3, the silencing device 1 includes the silencing body 11 and a protective part 14 provided between the housing 3 and the silencing body 11, and as shown in FIGS. 1 to 3, the protective part 14 includes a protective net 141 transversely provided between the silencing channel 12 and the outer vent 31; the protective part 14 is clamped to a port of the silencing channel 12, the protective part 14 is configured to prevent external insects, mice, or the like, from entering the cavity 20, and does not affect the entrance and exit of the air flow, and the protective part 14 is provided with a buckle 142 and clamped to the silencing body 11, such that assembly is convenient.

Further, the silencing device 1 includes the plurality of silencing cavities 15 provided on the path of the silencing channel 12, the silencing cavities 15 include openings 151 facing the silencing channel 12, and the volumes of at least two silencing cavities 15 are different. At least part of the sound enters the silencing cavity 15 through the opening 151, the silencing cavity 15 has a certain depth, and the sound enters the opening 151 and then is propagated inside the silencing cavity 15, such that the propagation path of the sound during passing through the through hole is prolonged, and the noise reduction effect is achieved by providing an acoustic metamaterial. The volume of the silencing cavity 15 can determine a frequency range of the sound capable of being eliminated by the silencing cavity 15; that is, different silencing cavities 15 have different silencing frequency ranges, and therefore, the sound can enter different openings 151 by adjusting the volumes of different silencing cavities 15, so as to eliminate the noise with different frequencies, such that the silencing device 1 has wider silencing frequencies.

Further, an embodiment of the present invention provides an assembling method of the refrigeration apparatus 100, including the following steps:

fixedly connecting the silencing device 1 in the foaming space 101 outside the compressor bin 2;

mounting the housing 3; and injecting the foaming agent into the foaming space 101.

That is, after the silencing device 1 is fixed in the foaming space 101, the foaming agent is injected into the foaming space 101, such that the foaming agent firmly fixes the silencing device 1 in the foaming space 101, and the beneficial effect of the above relevant content that the foaming material has a fixing function is achieved.

Compared with the prior art, the present embodiment has the following beneficial effects:

A silencing device is provided in a foaming space 101, and since the foaming space 101 unavoidably occupies some spaces, a space inside the refrigeration apparatus is not occupied when the foaming space 101 is utilized, and a compressor bin is connected with the outside through a silencing channel, energy of sounds is weakened during outward heat dissipation of the compressor bin, and noise radiated outwards from the compressor bin is reduced, such that the solution realizes good balance between noise reduction and space utilization of the refrigeration apparatus, noise generated by the refrigeration apparatus is small, a space utilization rate is high, and use experiences of a user are improved greatly.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A refrigeration apparatus, comprising a compressor bin and a housing, wherein the compressor bin is provided in the housing, and a foaming space is provided between the compressor bin and the housing; the refrigeration apparatus further comprises a silencing device provided in the foaming space, the compressor bin comprises an inner vent communicated with the outside, the housing comprising an outer vent opposite to the inner vent, the silencing device comprises a silencing channel, and the silencing channel is communicated with the inner vent and the outer vent;

the compressor bin comprises a cavity and side walls arranged on two sides of the cavity, a flow channel is provided between the silencing device and the housing and/or the side wall, and the flow channel is communicated with a part of the foaming space above the silencing device and a part of the foaming space below the silencing device, and the flow channel is configured to allow a foaming agent to flow therethrough when the foaming agent is injected into the foaming space; the flow channel is separate and distinct from the silencing channel.

2. The refrigeration apparatus according to claim 1, wherein each of a left side and a right side of the compressor bin is provided with the inner vent, as well as the silencing device and the outer vent corresponding to the inner vent, one inner vent is set as an air inlet, and the other inner vent is set as an air outlet.

3. The refrigeration apparatus according to claim 2, wherein the refrigeration apparatus comprises a compressor provided in the cavity, the side walls are provided with the inner vents, the inner vents are communicated with the cavity, and the silencing devices are fixed on the side walls.

4. The refrigeration apparatus according to claim 3, wherein the side wall is provided with a plurality of first clamping parts, the silencing device comprises a silencing body and a plurality of second clamping parts arranged on a side of the silencing body facing the side wall and clamped to the first clamping parts, and the side wall is fixedly connected with the silencing device by a fastener.

5. The refrigeration apparatus according to claim 4, wherein the first clamping part comprises a clamping opening and a first clamping block, the second clamping part comprises a second clamping block and a clamping groove, the second clamping block is connected to the first clamping block through the clamping opening, and the first clamping block is fixed in the clamping groove.

6. The refrigeration apparatus according to claim 3, wherein the silencing device is hermetically connected with the housing, the silencing device comprises a silencing body and a protective part provided between the housing and the silencing body, and the protective part comprises a protective net transversely provided between the silencing channel and the outer vent; the protective part is clamped to a port of the silencing channel.

7. The refrigeration apparatus according to claim 1, wherein the silencing device comprises a plurality of silencing cavities, and the silencing cavities comprise openings towards the silencing channel.

8. The refrigeration apparatus according to claim 7, wherein at least two of the silencing cavities have different volumes.

9. A production method of a refrigeration apparatus, wherein the refrigeration apparatus is configured as the refrigeration apparatus according to claim 1, and the production method comprises the following steps:

fixedly connecting the silencing device in the foaming space outside the compressor bin;

mounting the housing; and
injecting a foaming agent into the foaming space.

* * * * *